March 11, 1969  F. W. D. L. LARSON  3,432,678
CONTROL CIRCUIT FOR SEQUENTIALLY TRIGGERING A PLURALITY OF
SILICON CONTROLLED RECTIFIERS UPON SEQUENTIAL
ACTUATIONS OF A SWITCH
Filed March 1, 1965

INVENTOR
FRANK W. D. L. LARSON
BY *Smart & Biggar*
ATTORNEYS.

United States Patent Office 3,432,678
Patented Mar. 11, 1969

3,432,678
CONTROL CIRCUIT FOR SEQUENTIALLY TRIGGERING A PLURALITY OF SILICON CONTROLLED RECTIFIERS UPON SEQUENTIAL ACTUATIONS OF A SWITCH
Frank William Douglas Landor Larson, Montreal, Quebec, Canada, assignor to St. Regis-Consolidated Packaging Limited, Montreal, Quebec, Canada
Filed Mar. 1, 1965, Ser. No. 436,020
U.S. Cl. 307—38                                                13 Claims
Int. Cl. H02j 3/14

ABSTRACT OF THE DISCLOSURE

A control circuit having a switch which, upon being closed and subsequently opened, switches a source of voltage from one load to another. Each load is connected in series with a different SCR and each SCR is adapted to be triggered by an associated unijunction transistor circuit. Commutating means are provided to ensure that a different unijunction transistor circuit is made operative each time to thereby trigger a different SCR upon each switch opening.

This invention relates to a control circuit and more particularly to a trigger circuit which may be used for controlling the conduction of controlled rectifiers that alternately switch a source of voltage from one load to another.

In many applications where a machine such as a packaging machine operates in a cyclic fashion, it is often desirable to switch sequentially a source of electrical power from one load to another to complete a number of successive operations. The machine then remains passive until reactuated by a primary control switch whereupon the sequence of operations is repeated. In the past, timers, relays and switches have been widely used to control such actions. The moving parts of these components often resulted in failures due to wear. Wear and malfunctions are particularly troublesome when the environment is dusty, corrosive, or damp. Moreover, it has also been found that conventional devices of this type do not satisfy the necessity of providing a control switch capable of initiating a cycle of operations upon receipt of the intended control signal, without response to spurious closings and openings due to vibration and contact bounce. Such spurious openings and closings can occur both before and after the switch has made its required operation and will cause malfunctions unless the apparatus being controlled is so arranged as to discriminate between spurious signals and those intended to control its operation.

With the advent of solid state switching devices such as controlled rectifiers, the need for mechanical switches has gone. In order to utilize a plurality of controlled rectifiers for controlling the electrical power applied consecutively to a number of loads, it is necessary to incorporate trigger circuits which will turn on the rectifiers in the desired sequence. In the past, various trigger circuits have been proposed for turning on a controlled rectifier in response to the actuation of a control signal. Many of these trigger circuits incorporate unijunction transistors which are used to control a discharge of electricity from an associated capacitor so that this discharge can be released to the gate of the controlled rectifier at the correct instant and thus trigger the controlled recifier into its conductive state. This is normally achieved by charging the said capacitor to the voltage at which it will forward bias the emitter of the unijunction transistor. This is the basis of various flashers, phase controlled power supplies and the like.

Although the disadvantages associated with mechanical devices can in some measure be avoided by using controlled rectifiers, at some point in the circuit it will be necessary to have a switch or other signalling device for the purpose of initiating operation of several controlling devices. Such switch will, for various reasons, give unwanted signals of short duration before the control is to be operated and unwanted signals of both short and long duration for a time after the control has been operated. It is accordingly desirable to provide an arrangement having substantial discrimination against such unwanted signals.

I have found that the aforementioned difficulties may be overcome by providing a control device having at least one trigger circuit which includes a unijunction transistor having an emitter and first and second bases. An impedance, which may in many instances be a resistor, has one terminal connected to the first base. A first source of voltage has a first terminal connected to the other end of the impedance and a second terminal connected to the second base. A first capacitor is connected between the emitter and the first terminal and a second capacitor is connected between the bases. Means including a current limiting device are provided for establishing a voltage at the emitter and a device is included for interrupting the first source of voltage whereby the unijunction transistor emitter becomes forward conducting after a predetermined time interval, and thereby discharges the first capacitor through the impedance and develops a triggering voltage thereacross. In preferred embodiments of my invention the means for establishing a voltage at the emitter can consist of a relatively simple resistor type voltage divider connected across the first source itself or some other source independent thereof. In other embodiments of my invention I provide a diode through which the second terminal of the source is connected to the second base of the unijunction transistor, if desired through a temperature compensating resistor. It is also possible to connect the second capacitor between the first and second bases in a number of different ways including for instance an arrangement in which one end of the capacitor is connected to the first terminal of the first source of voltage and the other connected to the second base through a temperature compensating resistor. By means of the use of one or more basic triggering circuits of the type described, the invention makes possible control circuits for selectively energizing loads, in accordance with a predetermined time sequence and delay, under conditions in which the circuit will be able to provide substantial discrimination against spurious signals.

More specifically, the invention may be applied to a circuit comprising two control rectifiers, each of which is in series with a load. Each rectifier has associated with it a trigger circuit in accordance with my invention. The first capacitor is in such an arrangement connected through a voltage divider to the anode of the rectifier controlled by the trigger circuit in question. The control rectifiers and the loads are arranged in flip-flop configuration and are so connected that when one control rectifier is triggered by its associated trigger circuit, the other is rendered nonconducting by a commutating capacitor connected between the two anodes. Such commutating capacitor charges when one control rectifier is conducting and the other is not. When the non-conducting control rectifier is triggered into the conducting state the charge on the commutating capacitor is released and momentarily opposes the flow of current through the other control rectifier so as to force it into its blocked state. This establishes a flip-flop action between the control rectifiers.

The present invention also makes it possible for any number of control units to share the same switch without interaction or loading problems, for all spurious signals of short duration to be ignored, and for a timed period after the control has been actuated during which switch signals of either short or long duration will not again actuate the control.

As a means of cascading control units magnetic reed relays may be included in the load of one or both controlled rectifiers or they may be wired in shunt with one or both of the controlled rectifiers. The magnetic reed switches can then act as switch for additional control units. In this way a complex system can be constructed.

In one preferred embodiment of the invention, both of the trigger circuits are actuated by a common control element. It is also possible to actuate the triggers with separate control elements. In other preferred embodiments, only one trigger circuit is connected to the control element while the other trigger circuit is adapted to operate a predetermined time interval after the first trigger circuit is actuated.

In addition, the control circuits may be arranged so that upon initial actuation of the control element after application of the supply voltages, one of the controlled rectifiers will always fire before the other thereby establishing a firing sequence. A single actuation of the control element in the trigger circuit will then start the switching sequence in its proper order. Also, the control circuits are arranged so that this switching action will take place a short predetermined time interval after the control switch is actuated. In addition there is incorporated a delay after switching during which the trigger does not respond to the control switch.

The invention will now be described in connection with the attached figure of drawings in which.

Figure 1:
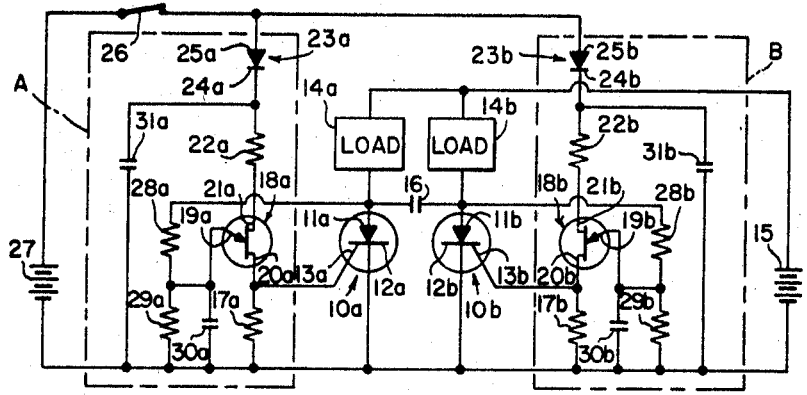
FIGURE 1 is a schematic circuit diagram of a control circuit, in accordance with the invention, having two trigger circuits both of which are controlled by a single control switch.

In certain figures of the drawings, the two halves of the control circuit are identical. Therefore, the reference numerals of one half of the circuit carry the suffix $a$ while those of the other half carry the suffix $b$. In the description, only the reference numerals without the suffix will be referred to except when it is necessary to distinguish between the components of the two halves of the circuit. Reference numerals in the drawings not followed by a suffix $a$ or $b$ will have no counterpart in the other half of the circuit or will be common to both halves.

Referring now to FIGURE 1 of the drawings, the control circuit comprises a controlled rectifier 10 having an anode 11, a cathode 12 and a gate 13. Connected in series with the anode 11-cathode 12 is a load 14 across a direct-current source of voltage which is common to both halves of the circuit so that the two cathodes 12a and 12b are connected together and to the negative terminal of the source 15. Connected between the two anodes 11a and 11b is a coupling capacitor 16.

Each half of the control circuit includes a trigger circuit, generally labelled A or B, forming part of the control circuit.

The trigger circuits A and B each comprise a first resistor 17, a unijunction transistor 18 having an emitter 19, a base-one 20 and a base-two 21, a temperature compensating resistor 22, and a diode 23 having a cathode 24 and an anode 25. The resistor 17 is connected in shunt with the cathode 12-gate 13 of the controlled rectifier 10 and in series with the base 20-base 21, the resistor 22, the diode 23, and a switch 26, across the negative-positive terminals of a second direct-current source of voltage 27. The two negative terminals of the sources of voltage 15 and 27 are connected together.

In addition, the trigger circuits A and B each include a resistor 28 connected between the emitter 19 and the anode 11 of their associated controlled rectifier 10, and a resistor 29 and a capacitor 30 both connected in shunt between the emitter 19 and the negative terminal of the second source of voltage 27. Also included is a capacitor 31 connected fro mthe negative terminal of the source 27 to the junction of the resistor 22 and the cathode 24 of the diode 23.

In operation, the source of voltage 15 is applied across the controlled rectifiers 10a and 10b connected in series with the loads 14a and 14b respectively. When the circuits are first energized, neither of the controlled rectifiers 10a or 10b will be conducting, and consequently, substantially the full voltage from the source 15 is dropped across the anodes 11-cathodes 12. Therefore, the capacitor 30 will charge via resistor 28 so that the voltage at the emitter 19 of each unijunction transistor 18 will rise to a relatively low value determined by the supply voltage 15, the impedance values of the resistors 28, 29 and load 14, which form a voltage divider network, and the conductance of the emitter of the unit.

If, at the beginning of operation of the device, switch 26 is closed, a voltage will be applied from the source 27 across the base 20-base 21 of the unijunction transistor 18 through the resistors 17 and 22 and the forward biased diode 23 so that a certain interbase voltage is established between 20 and 21. However, the voltage divider formed by load 14 and resistors 28 and 29 is selected such that the emitter voltage, i.e., the voltage on capacitor 30, is insufficient to trigger the unijunction transistor 18 at that high a value of interbase voltage. So long as switch 26 remains closed, this condition will continue and neither of the controlled rectifiers 10a or 10b will "fire" and accordingly, neither load 14a or 14b will be energized.

Upon opening the switch 26, the capacitor 31 commences to discharge through the unijunction transistor 18 and the resistors 17 and 22. The discharging of capacitor 31 continues at a relatively slow rate until the interbase voltage drops to a sufficiently low value that the voltage on capacitor 30, and hence the emitter 19 voltage, equals the peak-point voltage for the unijunction transistor 18, at which time it "fires" and rapidly discharges capacitor 30 through resistor 17 and the gate 13 of controlled rectifier 10, thereby causing controlled rectifier 10 to "fire," i.e., conduct current between its anode and cathode and hence through load 14. This action can be readily understood when it is recalled that the peak-point voltage for a unijunction transistor increases or decreases as its interbase voltage increases or decreases. Thus, with switch 26 closed, there is a certain interbase voltage across unijunction transistor 18 which establishes a peak-point voltage higher than the voltage on capacitor 30. However, when switch 26 is opened, the voltage on capacitor 31 gradually decays so that the interbase voltage across the unijunction transistor 18 decreases and, simultaneously, the peak-point voltage of the unijunction transistor decreases. As mentioned previously, when the peak-point voltage of unijunction transistor 18 drops to the value of the voltage on capacitor 30, the unijunction transistor 18 "fires."

In order to avoid any "ambiguity" in operation of the circuit, it is desirable to insure that one of the controlled rectifiers (say 10a) always fires first after initial operation of the circuit. To do this the values of the resistors 28 and 29 which establish the voltage at the emitter, and the capacitors 31 which control the rate of decrease of the interbase voltage, are so chosen that the voltage at the emitter 19a reaches the peak point voltage of the unijunction transistor 18a an appreciable time before the emitter of 19b reaches the peak point voltage of 18b.

Thus the controlled rectifier 10a will fire initially before the controlled rectifier 10b, all other values being equal. The controlled rectifier 10b will then fire when the peak point voltage of unijunction transistor 18b has been reached. The relative time constants of the control circuits A and B should be chosen for this to occur a sufficient time (e.g., of the order of one millisecond) after the firing of rectifier 10a to permit commutating capacitor 16 to attain a charge great enough to permit it to cut-off rectifier 10a as soon as rectifier 10b is fired and thereby establish a reliable flip-flop operation.

It will be apparent from the foregoing that upon initial operation of the circuit, both controlled rectifiers are cut-off and the initial switch signal (i.e., the opening of switch 26) first turns on rectifier 10a. After a predetermined time interval, rectifier 10b is triggered "on" and thus automatically turns off 10a. When this condition has been reached, a single switch signal (i.e., a further opening of the switch 26) will cause only one change of state—i.e., the triggering on of the rectifier previously off, and the turning off of the rectifier previously on.

Following the initial operation of the circuit as a result of which (in the particular example here discussed) controlled rectifier 10b is supplying load 14b, and controlled rectifier 10a is "cut-off," subsequent operation of the circuit in response to further openings of switch 26 is as follows. The firing of the controlled rectifier 10b results in a substantial decrease in the supply voltage across it. This in turn results in a substantial decrease in the voltage at the emitter 19b of the unijunction transistor 18b and thereby renders it inoperative for further triggering of the controlled rectifier 10b at this point in the cycle of operation of the circuit. Moreover, the voltage across the cut-off controlled rectifier 10a has now risen to substantially the whole supply voltage 15. As is apparent from FIGURE 1, this voltage is applied across resistors 28a and 29a. If switch 26 is open (as it normally will be after the "initial" operation of the circuit described above) the emitter 19a of unijunction transistor 18a will be forward biased, thus providing a leakage current which prevents accumulation of any substantial charge on capacitor 30a. When switch 26 is closed in preparation for it to be opened again to actuate the circuit, the potential of base 2 is raised to the point where the emitter 19a is no longer forward biased with the result that capacitor 30a will commence to charge exponentially to a voltage determined by the values of the voltage divider constituted by the load 14a, the resistors 28a and 29a and, of course, the supply 15. Until the voltage thus established across capacitor 30a exceeds a predetermined value, however, the trigger circuit A cannot fire the controlled rectifier 10a even if switch 26 should momentarily reopen due to contact bounce or vibration; this feature provides a predetermined minimum time delay between successive actuations of the circuit.

With switch 26 closed, capacitor 31a will be charged to the supply voltage 27. Assuming that the aforementioned predetermined minimum time for adequate charge to be accumulated on capacitor 31a has elapsed, reopening of switch 26 will cause capacitor 31a to discharge through resistors 17a and 22a and the unijunction transistor 18a. At this point diode 23a prevents the capacitor 31a from discharging through the trigger circuit B or any other circuit which switch 26 may control. As capacitor 31a discharges, the interbase voltage of the unijunction transistor 18a decreases until the point where the emitter 19a is forward biased as hereinbefore described. This has the effect of permitting capacitor 30a to discharge through resistor 17a and to develop thereacross a voltage sufficient to trigger controlled rectifier 10a into conduction. This in turn causes a sharp decrease in the anode 11a-cathode 12a voltage which is in turn coupled to the anode 11b-cathode 12b of controlled rectifier 10b by the commutating capacitor 16. As referred to above, this has the effect of reducing the current through controlled rectifier 10b below its holding value for maintaining anode-cathode conduction so that controlled rectifier 10b returns to its blocking state and will remain there until it is again triggered.

When switch 26 is again closed and then reopened, it will cause trigger circuit B to again actuate controlled rectifier 10b in the manner described above with the result that controlled rectifier 10a will return to its blocking state. Thus the voltage from source 15 is alternately applied across the two loads 14a and 14b in response to alternate openings of the switch 26.

If the values of the resistors 17a and 22a, and the capacitor 31a are chosen so that the rate of decay of voltage at the cathode 24a of diode 23a is greater than at the cathode 24b of diode 23b, whenever the switch 26 is opened, diode 23a may be eliminated provided there will be no interaction with other controls sharing power supply 27 and switch 26. The rate of decay of voltage at the cathode 24b is, of course, determined by the values of resistors 17b and 22b, and capacitor 31b.

The circuit thus described affords substantial protection against spurious openings of switch 26 of short duration. If, after the switch 26 has been closed for some time, the switch 26 should be opened and then closed very quickly, as in the case of a spurious operation due to vibration or the like, the voltage across the capacitor 31 will not have decayed to the point where the peak-point voltage equals the voltage on emitter 19 before the switch 26 once again closes and capacitor 31 is recharged. Since the resistance in series with capacitor 31 for charging is much less than for discharging, the system resets itself quickly.

Moreover, the circuit also provides means for ignoring the effect of brief, spurious closings of switch 26. Thus if, after switch 26 has been open for some time, it is momentarily closed and then opened again within the space of a predetermined minimum time, no triggering will take place. This is so because, when switch 26 is open, the voltage on capacitor 30 is relatively low (i.e., of the order of one volt) since the emitter 19 is forward biased and the flow of current to the capacitor is restricted by the resistor 28. Such a low voltage is insufficient for triggering controlled rectifier 10. When switch 26 is closed, however, the emitter 19 is reverse biased and the capacitor 30 begins to accumulate a charge. Depending on the time constant of the circuit, however, a predetermined minimum time must elapse before the charge on capacitor 30 is big enough to provide a voltage sufficient to fire controlled rectifier 10 when switch 26 is again opened. It follows, therefore, that switch 26 must remain closed for a predetermined minimum time before reopening of the switch will cause the circuit to be triggered. This effect is achieved by connecting resistor 28 to the anode of the controlled rectifier 10 which is to be triggered by the circuit in question. When the controlled rectifier 10 is conducting the anode 11 voltage will be (say) about one and one-half volts. This would be insufficient to charge capacitor 30 to a point where it would be able to trigger controlled rectifier 10. As a result, therefore, the capacitor 30 will not be able to accumulate sufficient charge to enable it to trigger rectifier 10 until (a) the rectifier is in the "blocked" condition resulting in the anode 11 voltage being relatively high, and (b) sufficient time has elapsed to permit adequate voltage to be established across the capacitor.

If the delay referred to above is not desired, it is possible to connect resistor 28 to a source of potential independent of the condition of the rectifier 10. Such an arrangement is shown in FIGURE 3 wherein resistor 28 is connected through diode 23 and switch 26 to source 27, thus permitting a charge to be established on the capacitor 30 which is independent of the voltage appearing across rectifier 10.

Figure 2:
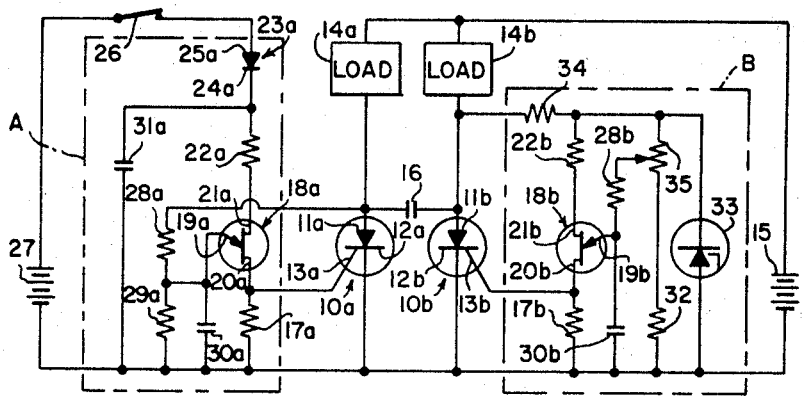
FIGURE 2 is a schematic circuit diagram of a variation of the control circuit illustrated in FIGURE 1 in which only one of the trigger circuits is controlled by the control switch.

In the embodiment illustrated in FIGURE 2, the trigger circuit A is the same as that shown in FIGURE 1. Trigger circuit B has, however, been modified by arranging for the voltage for it to be obtained from the voltage drop across the controlled rectifier 10b. Resistor 17b, unijunction transistor 18b, resistor 22b, resistor 28b and capacitor 30b serve the same function as described above with reference to FIGURE 1. In this case however, resistor 28b, rather than being returned directly to anode 11b, is connected to the movable arm of potentiometer 35 which forms part of a variable voltage divider network comprising the potentiometer 35 and a resistor 32 connected in series between the bottom of resistor 17b and one end of a voltage dropping resistor 34 whose other end is connected to anode 11b. To maintain a regulated supply of voltage to the trigger circuit B and thus insure accuracy of the timing interval, a Zener diode 33 is connected in shunt with trigger circuit B as shown. When the supply voltages 15 and 27 are turned on neither of the controlled rectifiers 10a or 10b will fire immediately and thus substantially the full voltage from the source 15 will attach across them. The voltage on the emitter 19b will begin to rise at a rate determined substantially by the time constant of resistor 28b and capacitor 30b. This will cause unijunction transistor 18b to fire after a predetermined time interval which will in turn trigger the controlled rectifier 10b and thus apply the supply voltage 15 across the load 14b.

When switch 26 is opened, capacitor 31a will begin to discharge as described above with reference to FIGURE 1. Following a predetermined time interval depending upon the time constant of circuit A, unijunction transistor 18a will permit capacitor 30a to discharge through resistor 17a, thus "triggering" the controlled rectifier 10a. As described above this will cause controlled rectifier 10b to return to the "blocked" condition as a result of the action of commutating condenser 16. Substantially the whole of the voltage of source 15 will then appear across controlled rectifier 10b with the result that capacitor 30b will commence to recharge. After a predetermined time interval, unijunction transistor 18b will again permit discharge of capacitor 30b so as to fire controlled rectifier 10b. As a result, therefore, the FIGURE 2 arrangement provides a timing circuit which will apply the supply voltage 15 for a timed period across the load 14a in response to a single opening of the switch 26, and thereafter reapply the supply voltage across the load 14b.

Figures 3, 4:
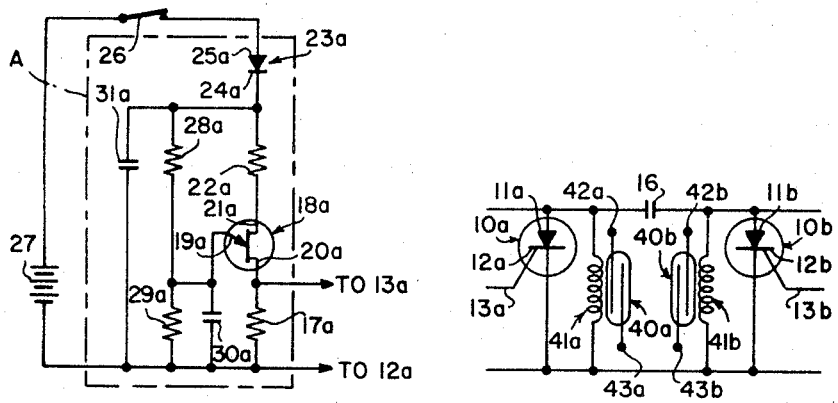
FIGURE 3 is a partial schematic circuit diagram of a variation of the control circuit illustrated in FIGURE 1.
FIGURE 4 is a fragmentary view of those portions of the circuits of FIGURE 1 or 2 immediately associated with the control rectifiers, in which magnetic reed relays are used in order to facilitate cascading of control units.

In FIGURE 4 is shown an arrangement giving a simple, preferred means of cascading control circuits in accordance with the invention. As shown in the figure, magnet reed switches generally represented at 40 have actuating coils 41 connected between anodes 11 and cathodes 12 of the controlled rectifiers 10. The contacts 42, 43 of the switches 40 then can be connected so as to constitute the controlling switch 26 in associated control circuits arranged in accordance with the other figures of the drawings.

What I claim is:

1. A control circuit having at least one trigger circuit which comprises: a unijunction transistor having an emitter and first and second bases; an impedance having one end connected to said first base; a first source of voltage having a first terminal connected to the other end of said impedance and a second terminal connected to said second base; a first capacitor connected between said emitter and said first terminal; a second capacitor connected between said first and second bases; means including a current limiting device for establishing a voltage at said emitter and a device for interrupting the first source of voltage whereby said second capacitor begins to discharge and the voltage on said second capacitor, and hence the interbase voltage on said unijunction transistor, decreases until the peak-point voltage of the unijunction transistor equals the voltage on said first capacitor at which time the unijunction transistor conducts heavily and discharges said first capacitor through the impedance and develops a triggering voltage thereacross.

2. A circuit as claimed in claim 1, wherein the impedance is a resistor.

3. A circuit as claimed in claim 1, wherein said means comprises a second resistor connected in shunt with said first capacitor, and a third resistor having one end connected to the emitter and the other end connected to a source of potential.

4. A circuit as claimed in claim 3, wherein said last-mentioned source of potential is a second source independent of said first source.

5. A circuit as claimed in claim 3, wherein said last-mentioned source of potential is said first source.

6. A circuit as claimed in claim 1, wherein said second capacitor is connected in shunt with said first source.

7. A circuit as claimed in claim 1, wherein said second terminal is connected to the second base through a diode.

8. A circuit as claimed in claim 1, wherein said second terminal is connected to the second base through a temperature compensating resistor.

9. A circuit as claimed in claim 1, wherein said second terminal is connected to the second base through a diode and temperature compensating resistor in series.

10. A circuit as claimed in claim 9, wherein said second capacitor is connected to said second base through said temperature compensating resistor.

11. A control circuit for alternately energizing first and second loads through first and second controlled rectifiers respectively, said circuit comprising: a source of power; first and second controlled rectifiers each having a cathode, an anode and a gate; each of said cathodes being connected to one terminal of said source of power; means respectively connecting said first and second loads between the anodes of said first and second rectifiers and said other terminal of the source of power; a commutating capacitor connected to each of the anodes of said controlled rectifiers; first and second trigger circuits operatively associated with said first and second rectifiers for firing the same so as to connect the associated load to said source of power, at least one of said trigger circuits including a unijunction transistor having an emitter and first and second bases, an impedance having one end connected to said first base, a first source of voltage having a first terminal connected to the other end of said impedance and a second terminal connected to said second base, a first capacitor connected between said emitter and said first terminal, a second capacitor connected between said first and second bases, means including a current limiting device for establishing a voltage at said emitter, and a device for interrupting the first source of voltage whereby the unijunction transistor emitter becomes forward conducting after a predetermined time interval and thereby discharges the first capacitor through the impedance and develops a triggering voltage thereacross; and means applying said last-mentioned voltage to the gate of the associated controlled rectifier.

12. A control circuit for alternately energizing first and second loads through first and second controlled rectifiers respectively, said circuit comprising: a source of power; first and second controlled rectifiers each having a cathode, an anode and a gate; each of said cathodes being connected to one terminal of said source of power; means respectively connecting said first and second loads between the anodes of said first and second rectifiers and said other terminal of the source of power; a commutating capacitor connected to each of the anodes of said controlled rectifiers; first and second trigger circuits operatively associated with said first and second rectifiers for firing the same so as to connect the associated load to said source of power, each of said trigger circuits comprising a unijunction transistor having an emitter and first and second bases, an impedance having one end connected to said first base, a first source of voltage having a first terminal connected to the other end of said impedance and a second terminal connected to said second base, a first capacitor connected between said emitter and said first terminal, a second capacitor connected between said first and second bases, means including a current limiting device for establishing a voltage at said emitter, and a device for interrupting the first said source of voltage whereby the unijunction transistor emitter becomes forward conducting after a predetermined time interval, said interval being longer for one of the trigger circuits than for the other, whereby said first capacitor is discharged through said impedance and develops a triggering voltage thereacross; and means coupling said last-mentioned voltage to the gate of the associated rectifier.

13. A control circuit as defined in claim 11, wherein one of said trigger circuits comprises a timing circuit for triggering one of said rectifiers a predetermined time interval following the triggering of the other of said rectifiers.

References Cited

UNITED STATES PATENTS

| | | | |
|---|---|---|---|
| 3,075,136 | 1/1963 | Jones | 321—45 |
| 3,119,058 | 1/1964 | Genuit | 321—45 |
| 3,191,060 | 6/1965 | Mahoney | 307—88.5 |

ROBERT K. SCHAEFER, *Primary Examiner.*

H. J. HOHAUSER, *Assistant Examiner.*

U.S. Cl. X.R.

321—45